US012607404B2

(12) United States Patent
Jeong et al.

(10) Patent No.: US 12,607,404 B2
(45) Date of Patent: \*Apr. 21, 2026

(54) ELECTRODE DRYING SYSTEM AND ELECTRODE DRYING METHOD

(71) Applicant: LG Energy Solution, Ltd., Seoul (KR)

(72) Inventors: Eun Hoe Jeong, Daejeon (KR); Sang Hoon Choy, Daejeon (KR); Shin Wook Jeon, Daejeon (KR); Oh Cheol Kwon, Daejeon (KR); Jin Young Son, Daejeon (KR); Young Kuk Ko, Daejeon (KR)

(73) Assignee: LG Energy Solution, Ltd., Seoul (KR)

( \* ) Notice: Subject to any disclaimer, the term of this patent is extended or adjusted under 35 U.S.C. 154(b) by 873 days.

This patent is subject to a terminal disclaimer.

(21) Appl. No.: 17/913,987

(22) PCT Filed: Nov. 17, 2021

(86) PCT No.: PCT/KR2021/016879
§ 371 (c)(1),
(2) Date: Sep. 23, 2022

(87) PCT Pub. No.: WO2022/119185
PCT Pub. Date: Jun. 9, 2022

(65) Prior Publication Data
US 2023/0128999 A1      Apr. 27, 2023

(30) Foreign Application Priority Data

Dec. 3, 2020      (KR) ........................ 10-2020-0167207

(51) Int. Cl.
F26B 21/35      (2026.01)
F26B 15/12      (2006.01)
H01M 4/04      (2006.01)

(52) U.S. Cl.
CPC .............. *F26B 21/35* (2026.01); *F26B 15/12* (2013.01); *H01M 4/0471* (2013.01)

(58) Field of Classification Search
CPC ........ F26B 21/10; F26B 15/12; H01M 4/0471
(Continued)

(56) References Cited

U.S. PATENT DOCUMENTS 9,096,079 B2 \* 8/2015 Priebe .................. B41J 11/0022
9,126,434 B2 \* 9/2015 Jessen ................ B41J 11/00242
(Continued)

FOREIGN PATENT DOCUMENTS

CN      1951693 A      4/2007
CN      206490132 U      9/2017
(Continued)

OTHER PUBLICATIONS

Search Report dated Nov. 15, 2024 from the Office Action for Chinese Application No. 202180024706.X Issued Nov. 12, 2024, pp. 1-2.
(Continued)

*Primary Examiner* — Stephen M Gravini
(74) *Attorney, Agent, or Firm* — Lerner David LLP

(57)      ABSTRACT

A system for drying an electrode includes a drying unit which dries an electrode which is moving on a transfer line; a thermal imaging camera which photographs a surface of the electrode in real time; a calculation unit which stores an image taken by the thermal imaging camera, and generates temperature distribution data in a width direction of the electrode from the image; and an output unit which outputs the image and the temperature distribution data in a width direction of the electrode.

16 Claims, 6 Drawing Sheets

(58) Field of Classification Search
USPC ........................................................ 34/116
See application file for complete search history.

(56) References Cited

U.S. PATENT DOCUMENTS

| | | | | |
|---|---|---|---|---|
| 10,347,905 | B2 * | 7/2019 | Nanba | H01M 4/0435 |
| 10,457,595 | B2 * | 10/2019 | Boek | C03C 17/02 |
| 12,173,962 | B2 * | 12/2024 | Zielinski | F26B 25/22 |
| 12,209,805 | B2 * | 1/2025 | Kim | H01M 4/139 |
| 12,228,338 | B2 * | 2/2025 | Chun | H05B 6/80 |
| 12,409,446 | B2 * | 9/2025 | Shen | C01B 3/26 |
| 2004/0048113 | A1 | 3/2004 | Murphy et al. | |
| 2007/0089623 | A1 | 4/2007 | Hamamoto et al. | |
| 2014/0014037 | A1 | 1/2014 | Watanabe et al. | |
| 2015/0207012 | A1 * | 7/2015 | Rogers | H10F 71/1272 |
| | | | | 438/69 |
| 2018/0131048 | A1 | 5/2018 | Kwak et al. | |
| 2020/0163261 | A1 * | 5/2020 | Choi | H01B 13/30 |
| 2023/0128999 | A1 * | 4/2023 | Jeong | F26B 21/10 |
| | | | | 34/446 |
| 2024/0072236 | A1 * | 2/2024 | Kim | F26B 13/104 |
| 2024/0410760 | A1 * | 12/2024 | Leeser | G06T 7/13 |

FOREIGN PATENT DOCUMENTS

| | | | | | |
|---|---|---|---|---|---|
| CN | 107735892 | A | | 2/2018 | |
| CN | 110608595 | A | | 12/2019 | |
| CN | 115443553 | A | * | 12/2022 | G01J 5/60 |
| EP | 4106041 | A1 | * | 12/2022 | G01J 5/60 |
| JP | H0850900 | A | | 2/1996 | |
| JP | H10104090 | A | | 4/1998 | |
| JP | H1137649 | A | | 2/1999 | |
| JP | 2005224658 | A | | 8/2005 | |
| JP | 2012138302 | A | | 7/2012 | |
| JP | 5897808 | B2 | | 3/2016 | |
| JP | 2019163903 | A | | 9/2019 | |
| JP | 6742013 | B1 | | 8/2020 | |
| KR | 20080057998 | A | | 6/2008 | |
| KR | 20130015398 | A | | 2/2013 | |
| KR | 101719694 | B1 | | 3/2017 | |
| KR | 101735034 | B1 | | 5/2017 | |
| KR | 101747493 | B1 | | 6/2017 | |
| KR | 20200012329 | A | | 2/2020 | |
| KR | 102111967 | B1 | | 5/2020 | |
| KR | 20220078077 | A | * | 6/2022 | G01J 5/60 |
| WO | WO-2022119185 | A1 | * | 6/2022 | G01J 5/60 |

OTHER PUBLICATIONS

International Search Report for Application No. PCT/KR2021/016879 mailed Mar. 2, 2022, pp. 1-3.
Extended European Search Report for Application No. 21900873.7 dated Sep. 15, 2023. 8 pgs.

* cited by examiner

【FIG. 1】
<u>100</u>
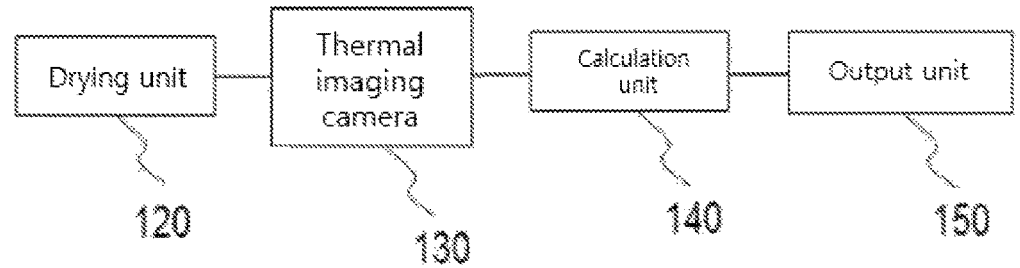
【FIG. 2】
<u>100</u>
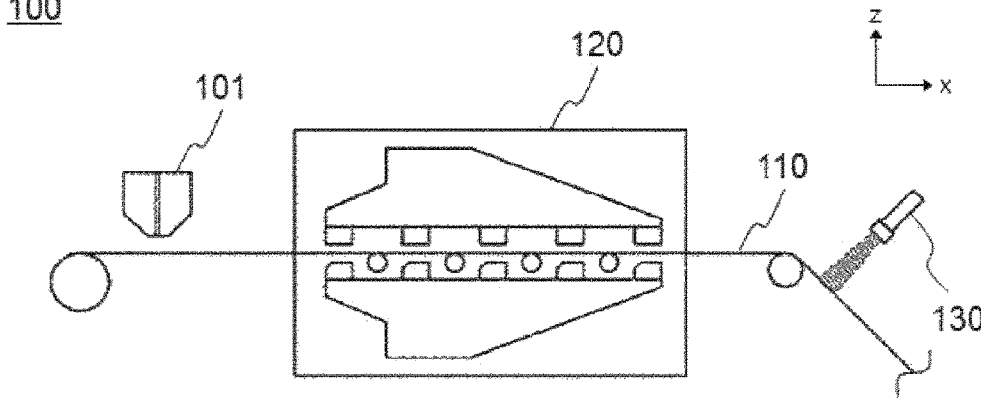

【FIG. 3】
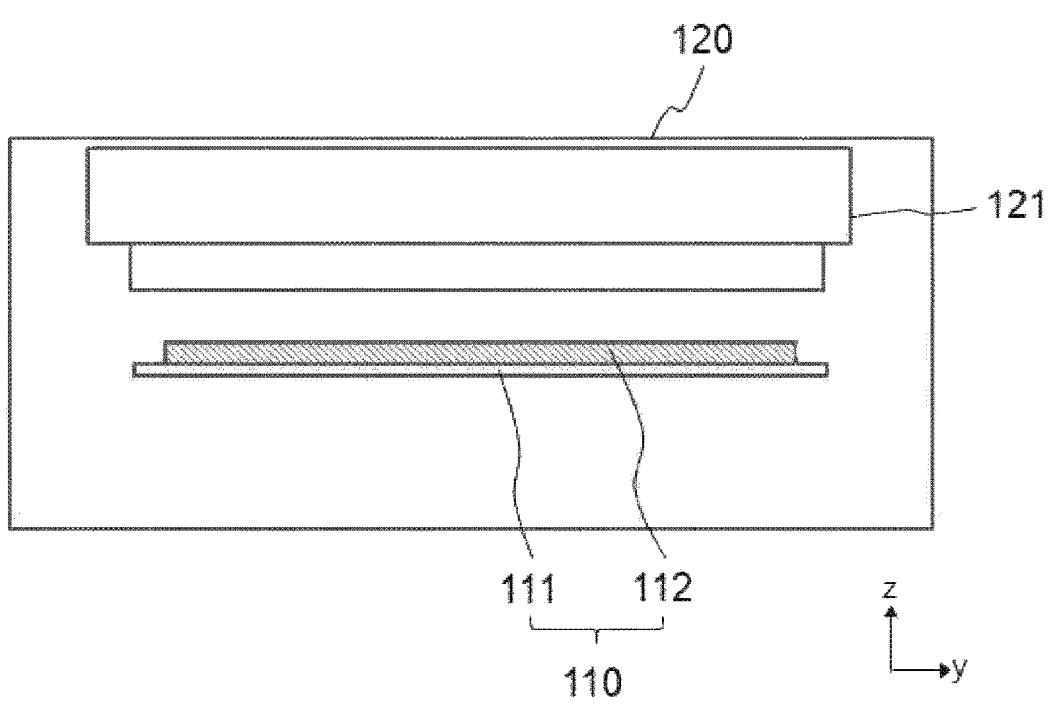

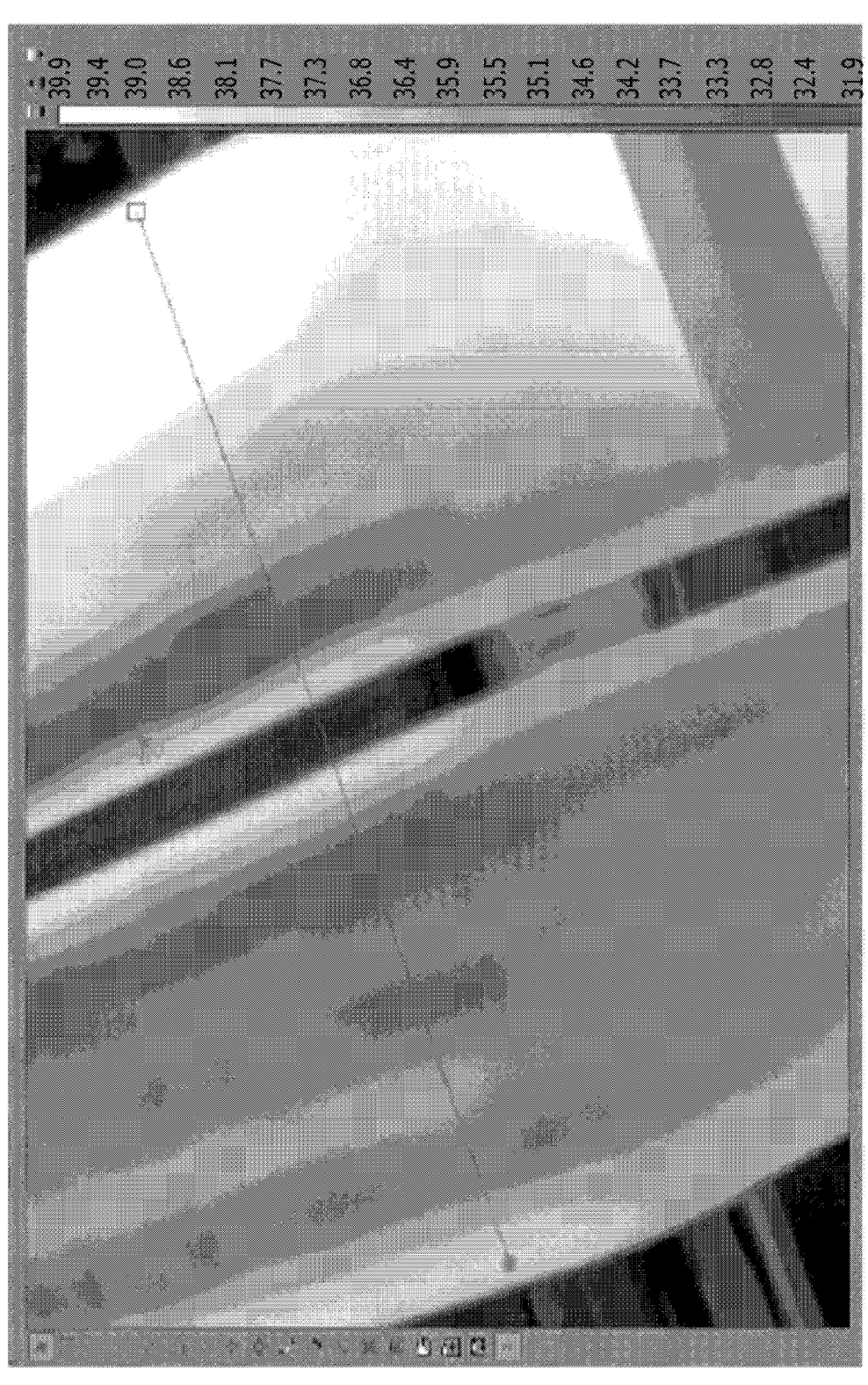
[FIG. 4]

【FIG. 5】
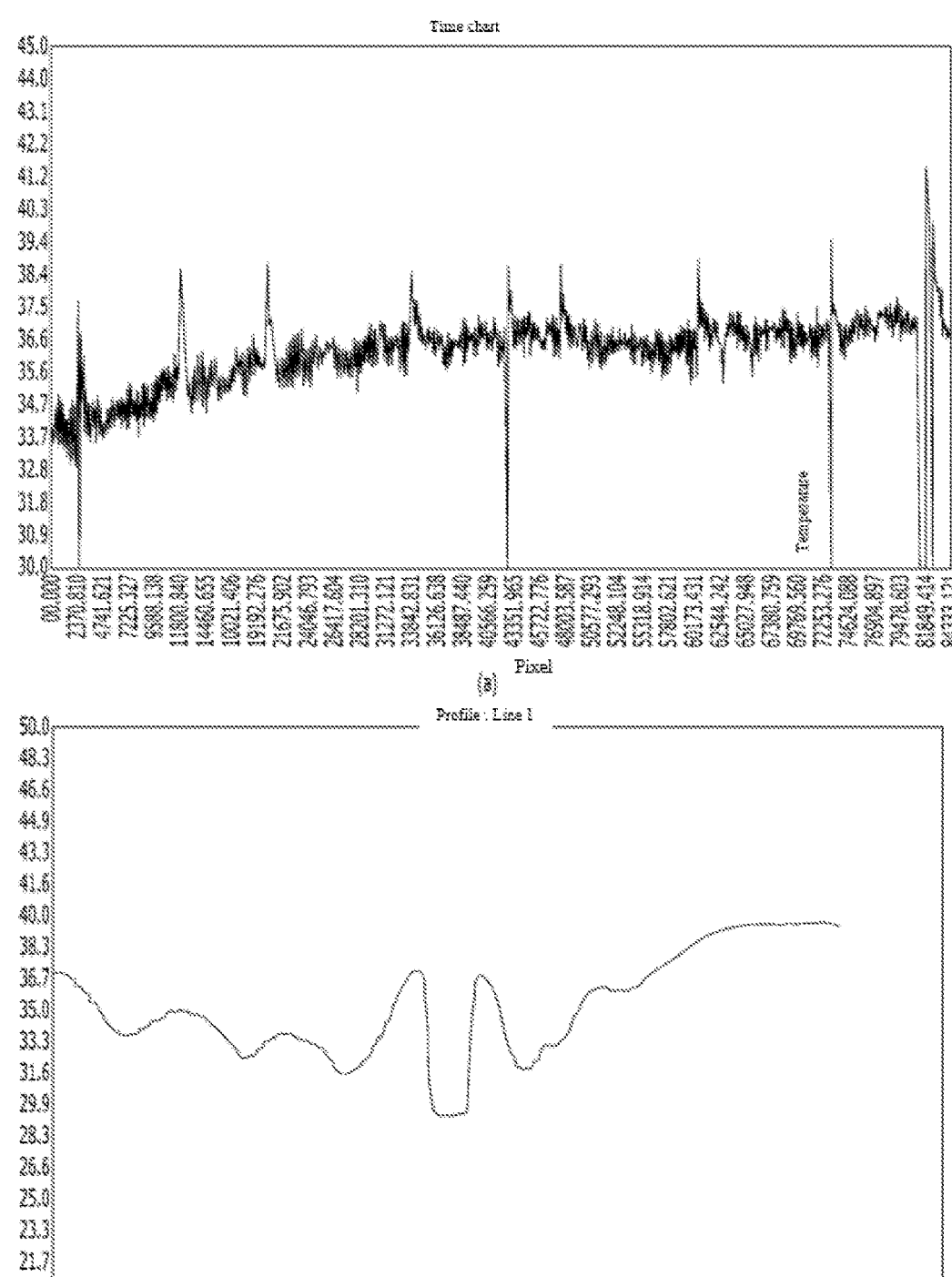

【FIG. 6】
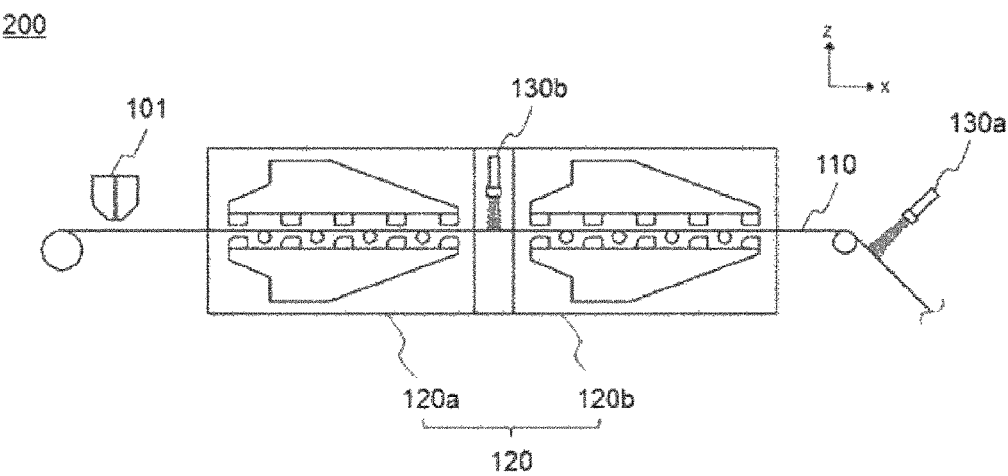
【FIG. 7】
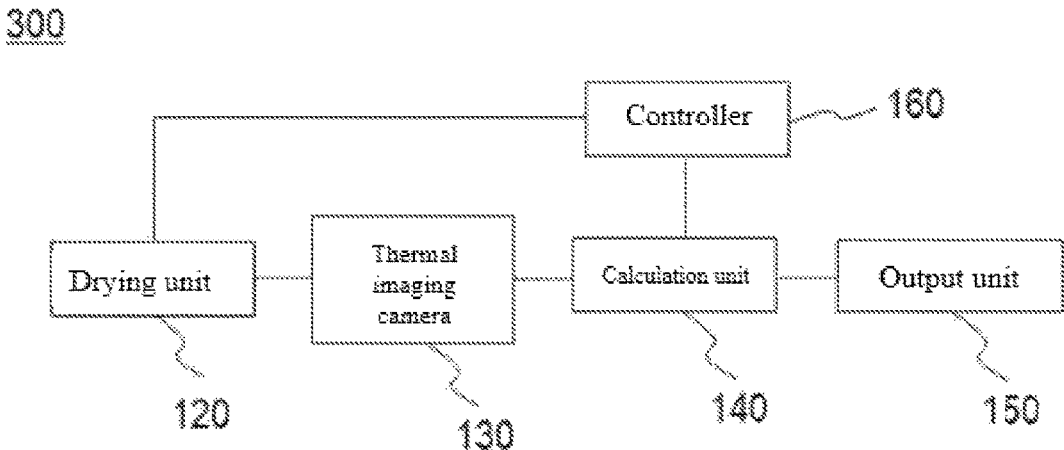

【FIG. 8】
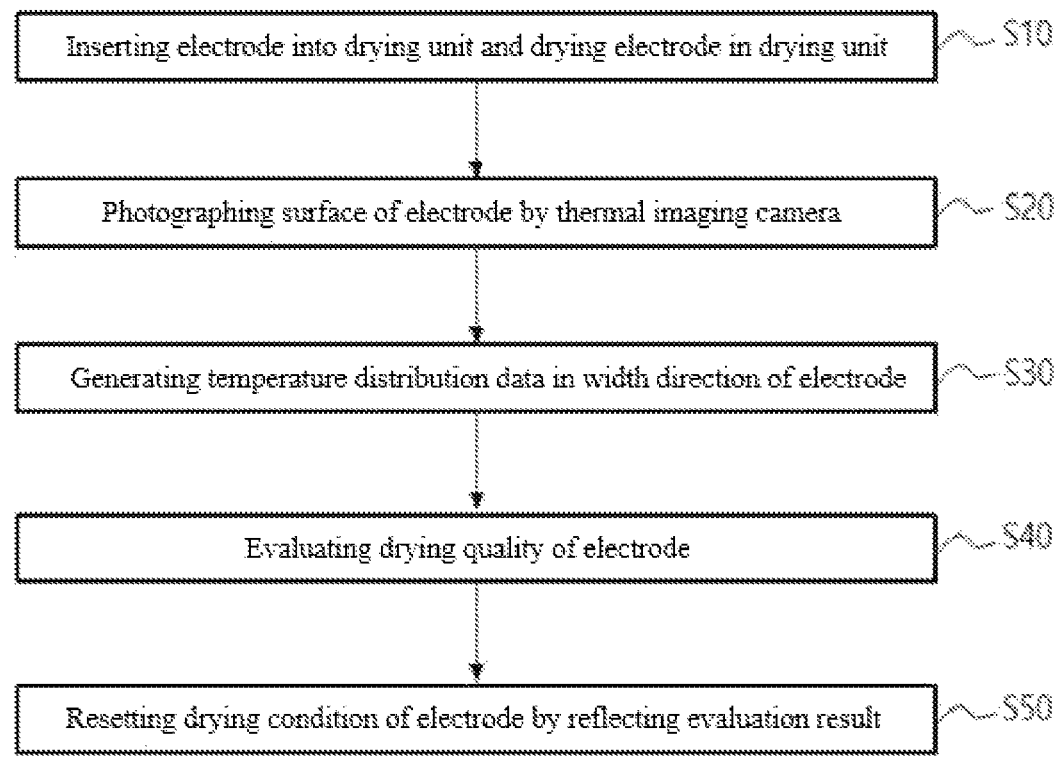
Inserting electrode into drying unit and drying electrode in drying unit ~ S10
Photographing surface of electrode by thermal imaging camera ~ S20
Generating temperature distribution data in width direction of electrode ~ S30
Evaluating drying quality of electrode ~ S40
Resetting drying condition of electrode by reflecting evaluation result ~ S50

ELECTRODE DRYING SYSTEM AND ELECTRODE DRYING METHOD

CROSS-REFERENCE TO RELATED APPLICATIONS

This application is a national phase entry under 35 U.S.C. § 371 of International Application No. PCT/KR2021/016879, filed on Nov. 17, 2021, which claims the benefit of priority based on Korean Patent Application No. 10-2020-0167207, filed on Dec. 3, 2020, and the disclosures of which are incorporated herein by reference.

FIELD OF INVENTION

The present invention relates to an electrode drying system and method, and more particularly, to an electrode drying system and method in which a thermal imaging camera is used.

BACKGROUND

Recently, secondary batteries capable of charging and discharging have been widely used as energy sources of wireless mobile devices. In addition, the secondary battery has attracted attention as an energy source for electric vehicles, hybrid electric vehicles, etc. Secondary batteries are proposed as a solution for air pollution over existing gasoline and diesel vehicles, which use fossil fuel. Therefore, due to such advantages, there is a diversity of applications using the secondary battery, and it is expected that the secondary battery will be applied to many other fields and products in the future.

Such secondary batteries may be classified into lithium-ion batteries, lithium-ion polymer batteries, lithium polymer batteries, etc., depending on the composition of the electrode and the electrolyte. There is an increased demand for lithium-ion polymer batteries which are less likely to leak electrolyte and which are easy to manufacture. In general, secondary batteries are classified into cylindrical batteries, prismatic batteries, and pouch-type batteries. For cylindrical and prismatic batteries, the electrode assembly is embedded in a cylindrical or rectangular metal can, respectively. For pouch-type batteries, the electrode assembly is embedded in a pouch-type case of an aluminum laminate sheet.

The electrode assembly built into the battery case is composed of a positive electrode, a negative electrode, and a separator interposed between the positive and negative electrodes. The electrode assembly is a power generating element, capable of charging and discharging. The electrode assembly is classified into a jelly-roll type wound, where the electrodes are sheet-shaped and are coated with active materials with a separator interposed between the positive electrode and the negative electrode, and a stack type, in which a plurality of positive electrodes and negative electrodes of a predetermined size are sequentially stacked while a separator is interposed therebetween.

The positive and negative electrodes are formed by applying positive and negative electrode slurries, containing positive and negative electrode active materials, to positive and negative electrode current collectors. The electrode slurries and current collectors are then dried and rolled.

In order to implement high power batteries, a method of increasing the amount of active material loaded on to the current collector may be used.

The drying process for the electrode surface and electrode sheet, coated with the active material layer, is an important step in maintaining the quality of the electrode and in preventing deviations and defects between products. It is also important to evaluate the drying quality of the electrode.

Conventionally, a thermometer or an infrared thermometer was used to measure such a surface temperature of an electrode. However, simply measuring the surface temperature of the electrode is insufficient to effectively evaluate the drying quality of the electrode. For example, even if a partial region of the electrode is completely dried, other regions of the electrode may not be. Despite various methods of using and arranging a plurality of thermometers to address this concern, it remains impossible to practically cover and measure the entire electrode surface.

Therefore, there is a need for a technology capable of easily and effectively determining the drying quality of an electrode.

BRIEF SUMMARY

The present invention is believed to solve at least some of the above problems. For example, an aspect of the present invention provides an electrode drying system and method capable of evaluating the drying quality of an electrode in real time.

A system for drying an electrode according to an embodiment of the present invention includes: a drying unit which dries an electrode that moves on a transfer line; a thermal imaging camera which photographs a surface of the electrode in real time; a calculation unit which stores an image taken by the thermal imaging camera, and generates temperature distribution data in a width direction of the electrode from the image; and an output unit which outputs the image and the temperature distribution data in a width direction of the electrode.

In a specific example, the thermal imaging camera may consecutively or sequentially photograph the surface of the electrode, and the calculation unit may store an image in a predetermined frame or time unit.

In a specific example, the calculation unit may calculate, in a width direction of the electrode, a temperature distribution change and average temperature over time from the image.

In a specific example, the thermal imaging camera may be positioned at an exit of the drying unit.

In another example, the thermal imaging camera may be positioned on a moving path of the electrode in the drying unit.

At this time, the drying unit is divided into a plurality of drying zones, and the thermal imaging camera may be positioned between the drying zones.

In a specific example, the electrode drying system may further include a jig which fixes the thermal imaging camera to make a predetermined angle with the electrode.

In further another example, the electrode drying system may further include a controller which evaluates a drying quality of the electrode from the temperature distribution data and resets a drying condition of the electrode by reflecting a result of the evaluation.

Further, the present invention provides a method for drying an electrode. The electrode drying method includes: inserting an electrode into a drying unit and drying the electrode in the drying unit; photographing a surface of the electrode by a thermal imaging camera; and generating temperature distribution data in a width direction of the electrode from the image obtained by the thermal imaging camera.

In a specific example, the temperature distribution data in a width direction of the electrode may include a temperature distribution change in a width direction of the electrode and an average temperature in a width direction of the electrode over time.

In a specific example, the photographing of the surface of the electrode by the thermal imaging camera is performed (a) during the drying of the electrode, (b) after the drying of the electrode, or (c) both during and after the drying of the electrode.

In a specific example, the electrode drying method may further include evaluating a drying quality of the electrode based on temperature distribution data in a width direction of the electrode.

In a specific example, if a temperature difference between a highest temperature and a lowest temperature exceeds a preset reference value in the temperature distribution in the width direction, it may be determined that a drying state of the electrode is defective.

In a specific example, when the average temperature in a width direction of the electrode is less than a preset reference value, it may be determined that a drying state of the electrode is defective.

Further, the electrode drying method may further include resetting a drying condition by reflecting a result of the evaluation.

According to the present invention, it is possible to secure temperature distribution data in a width direction of an electrode by using a thermal imaging camera. As such, it is possible to easily evaluate the drying quality of the electrode without inhibiting the efficiency of the manufacturing process.

BRIEF DESCRIPTION OF THE DRAWINGS

FIG. 1 is a block diagram showing the configuration of an electrode drying system according to an embodiment of the present invention.

FIGS. 2 and 3 are schematic diagrams showing a process of drying an electrode according to an embodiment of the present invention.

FIG. 4 is a photograph showing a dried state of an electrode, which has been obtained by photographing an electrode using a thermal imaging camera.

FIG. 5 is a graph showing temperature distribution data in a width direction of an electrode based on an image obtained by photographing the electrode using a thermal imaging camera.

FIG. 6 is a schematic diagram showing an electrode drying process according to another embodiment of the present invention.

FIG. 7 is a block diagram showing the configuration of an electrode drying system according to another embodiment of the present invention.

FIG. 8 is a flowchart showing the procedure of an electrode drying method according to the present invention.

DETAILED DESCRIPTION

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the other portion but also the case where another portion is interposed therebetween. On the other hand, when a portion such as a layer, a film, an area, a plate, etc. is referred to as being "under" another portion, this includes not only the case where the portion is "directly under" the other portion but also the case where another portion is interposed therebetween. In addition, to be disposed "on" in the present application may include the case disposed at the bottom as well as the top.

Further, in the present invention, "width direction" means a direction indicated by the width of the electrode (TD direction, x-axis direction) and means a direction perpendicular to the transfer direction of the electrode on the plane formed by the electrode (y-axis direction).

Hereinafter, the present invention will be described in detail with reference to the drawings.

FIG. 1 is a block diagram showing the configuration of an electrode drying system according to an embodiment of the present invention.

Referring to FIG. 1, an electrode drying system 100 according to one embodiment of the present invention includes: a drying unit 120 which dries an electrode which is moving on a transfer line; a thermal imaging camera 130 which photographs a surface of the electrode in real time; a calculation unit 140 which stores an image taken by the thermal imaging camera, and generates temperature distribution data in a width direction of the electrode from the image; and an output unit 150 which outputs the image and the temperature distribution data in a width direction of the electrode.

As described above, conventionally, the surface temperature of the electrode was directly measured using measuring means such as a thermometer to evaluate the drying quality of the electrode. However, simply measuring the surface temperature of the electrode was insufficient to evaluate the drying quality of the electrode.

According to the present invention, it is possible to secure temperature distribution data in a width direction of an electrode by using a thermal imaging camera. As such, it is possible to easily evaluate the drying quality of the electrode without inhibiting the efficiency of the manufacturing process. Namely, since it is possible to evaluate the drying quality of the moving electrode in real time, it is possible to detect a defect in advance and reduce the process loss by responding to the possible defect.

FIGS. 2 and 3 are schematic diagrams showing a process of evaluating a drying quality of an electrode according to an embodiment of the present invention.

Referring to FIGS. 2 and 3 together with FIG. 1, the electrode drying system 100 includes a drying unit 120 which dries an electrode.

The drying unit 120 may be made in the form of an oven. Specifically, the drying unit 120 provides a space where an electrode 110 is dried as a chamber shape. The manufacturing and drying processes of the electrode are performed in a roll-to-roll scheme. The electrode 110 may be inserted into the drying unit 120 along a predetermined transfer line and may be dried while moving in the drying unit 120.

The drying unit 120 may include a hot air nozzle or an infrared heater as a heat source 121 for drying the electrode therein. The hot air nozzle or the infrared heater may be arranged to be spaced apart at predetermined intervals along the transport direction (MD direction) of the electrode and apply hot air or infrared rays in a direction perpendicular to the electrode.

Further, the electrode 110 may have a structure where an electrode active material layer 112 is formed by applying an electrode slurry including an electrode active material on the current collector 111 and drying and rolling the electrode slurry. The process of applying the electrode slurry on the current collector may be performed by the coating die 101. The coating die 101 may have a general slot die shape, and the details of thereof are known to those of ordinary skill in the art, and thus detailed description thereof will be omitted.

The current collector may be a positive electrode current collector or a negative electrode current collector, and the electrode active material may be a positive electrode active material or a negative electrode active material. In addition, the electrode slurry may further include a conductive material and a binder in addition to the electrode active material.

Further, the electrode may be positive electrode or a negative electrode. More specifically, it may be a negative electrode where the desorption of the active material frequency occurs.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon. In addition, the positive electrode current collectors include aluminum or stainless steel, of which the surfaces have been treated with carbon, nickel, titanium, silver, or the like. The current collector may have fine irregularities on the surface thereof to increase the adhesion of the positive electrode active material. Various forms such as a film, a sheet, a foil, a net, a porous body, a foam, and a nonwoven fabric are possible.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}Md O_{(2-e)}Ae$ such as $Li_{1+z}Ni\frac{1}{3}Co\frac{1}{3}Mn\frac{1}{3}O_2$, $Li_{1+z}Ni0.4Mn0.4Co0.2O2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, $b+c+d<1$, M=Al, Mg, Cr, Ti, Si or Y, and A=F, P or Cl); olivine-based lithium metal phosphate represented by the formula $Li_{1+x}M_{1-y}M'_yPO_4-zX_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

Examples of the negative electrode active material include carbon such as non-graphitized carbon and graphite carbon; metal complex oxide such as $LixFe2O3(0 \leq x \leq 1)$, $LixWO2(0 \leq x \leq 1)$, $SnxMe1-xMe'yOz$ (Me: Mn, Fe, Pb, Ge; Me': Al, B, P, Si, groups 1, 2, and 3 of the periodic table, halogen; $0 \leq x \leq 1$; $1 \leq y \leq 3$; $1 \leq z \leq 8$); lithium alloy; silicon alloy; tin alloy; metal oxides such as SnO, SnO2, PbO, PbO2, Pb2O3, Pb3O4, Sb2O3, Sb2O4, Sb2O5, GeO, GeO2, Bi2O3, Bi2O4, and Bi2O5; conductive polymers such as polyacetylene; and Li—Co—Ni-based materials.

The conductive material is usually added in an amount of 1 to 30% by weight based on the total weight of the mixture including the positive electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the positive electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

Meanwhile, such an electrode slurry may be prepared by dissolving an electrode active material, a conductive material, and a binder in a solvent. The type of the solvent is not particularly limited as long as it is capable of dispersing an electrode active material, and either an aqueous solvent or a non-aqueous solvent may be used. For example, the solvent may be a solvent generally used in the art, such as dimethyl sulfoxide (DMSO), isopropyl alcohol, N-methylpyrrolidone (NMP), acetone, or water, and one of them alone or a mixture of two or more may be used. The amount of the solvent used may be such that the slurry can be adjusted to have an appropriate viscosity in consideration of the coating thickness, production yield, and workability of the slurry, and is not particularly limited.

The solvent is evaporated while the manufactured electrode 110 is moving in the space in the drying unit 120. At this time, the electrode drying system 100 according to the present invention may include a temperature measuring means for photographing the surface of the electrode 110 in real time in order to evaluate the dried degree of the electrode 110.

In the present invention, a thermal imaging camera 130 may be used as the temperature measuring means. Unlike a general thermometer, the thermal imaging camera 130 may measure the temperature of the entire region of the measurement object as well as one point of the measurement object by taking the temperature distribution of the entire measurement object as one screen.

This can be helpful to easy evaluation of the drying quality of the electrode. This is because it is not possible to uniformly dry the entire region of an electrode in the process of drying the electrode. Namely, there may be a deviation in the drying quality by regions of the electrode. For example, the drying speed of the edge portion of the electrode becomes faster than that of the central portion by superposition of hot air, based on the width direction of the electrode. Particularly, when an electrode having a wide width is dried, the deviation of the drying quality by points or regions becomes greater, which causes a defect of a product.

Hence, when a thermal imaging camera is used, it is easy to find out a less dried region, compared to a case in which a thermometer is used.

FIG. 4 is a photograph showing a dried state of an electrode, which has been obtained by photographing an electrode using a thermal imaging camera. FIG. 5 is a graph showing temperature distribution data in a width direction of an electrode based on an image obtained by photographing the electrode using a thermal imaging camera.

Referring to FIGS. 2 and 4, the thermal imaging camera 130 consecutively or sequentially photographs the surface of the electrode, which is the measurement object, to thereby detect the surface temperature distribution of the electrode. If the surface of the electrode is photographed using the thermal imaging camera 130, the temperature distribution by regions can be confirmed through colors. This makes it possible to simultaneously measure the temperature of two or more points of the measurement object. Further, since the consecutive temperature measurements between respective points is possible by using the thermal imaging camera 130, it is possible to intuitively or qualitatively grasp the temperature distribution of the entire region of the measurement object. Referring to FIG. 3, a less dried region is darker than a more dried region. Namely, it is possible to intuitively check the temperature distribution in the width direction and dried degree as a result of photographing the electrode using a thermal imaging camera, and if the entire surface of the electrode is bright without a dark region, it can be determined that the drying of the electrode has been completed.

Further, referring to FIGS. 1 and 2, the electrode drying system 100 includes a calculation unit 140 which stores an image taken by the thermal imaging camera 130, and generates temperature distribution data in a width direction of the electrode from the image.

If the surface of the electrode 110 is photographed by using the thermal imaging camera 130, an image, which shows the difference in color according to the temperature, may be obtained. This allows qualitative measurement of the temperature distribution of the surface of the electrode, particularly the temperature distribution in the width direction of the electrode, but it is difficult to measure the specific temperature distribution of the surface of the electrode and evaluate the dried degree according thereto. Further, there may be an error in evaluation, depending on the observer's viewpoint when only the image taken by the thermal imaging camera 130 is used, and there is a limit to automating the drying quality evaluation. The calculation unit 140 may improve the accuracy of the drying quality evaluation by converting the image taken by the thermal imaging camera

130 into specific temperature numerical values and generating temperature distribution data according to the width direction of the electrode and allows quick data processing and equipment automation.

Specifically, the calculation unit 140 stores the image taken by the thermal imaging camera 130 in predetermined frame or time units and converts the image into specific temperature numerical values, thereby generating temperature distribution data according to the width direction of the electrode. For example, the calculation unit 140 may calculate a temperature distribution change in a width direction of the electrode and an average temperature in a width direction of the electrode over time from the image as shown in FIG. 5.

FIG. 5(*a*) shows the average temperature in a width direction of the surface of the electrode over time and specifically shows the average of the temperature distribution in the width direction from predetermined points of the electrode according to the flow of time. In FIG. 5(*a*), the horizontal axis indicates the measurement time, and the vertical axis indicates the average temperature in a width direction of the electrode. In FIG. 5(*a*), it is seen that the average temperature in a width direction of the electrode gradually increases as the drying is performed.

FIG. 5(*b*) shows the temperature distribution change in a width direction of the electrode. In FIG. 5(*b*), the horizontal axis shows the relative position shown by each point on the line in the width direction of the electrode, and the vertical axis shows the temperature at each point. Referring to FIG. 5(*b*), the temperature at both edge portions in the width direction of the electrode is higher than that of the center portion, which indicates that the drying speed of both edge portions in the width direction of the electrode is higher than that of the center portion.

The calculation unit 140 may use a known method in order to convert the image taken by the thermal imaging camera 130 into specific temperature numerical values. For example, after deriving the correlation of the surface temperature of the electrode according to the color of the electrode shown on the thermal image from the database generated by accumulating thermal image data according to the actual surface temperature of the electrode, the correlation may be applied. Such obtained temperature distribution data in a width direction of the electrode may be used in evaluating the drying quality of the electrode and adjusting the drying condition.

Further, the thermal imaging camera 130 may be installed at one point and consecutively or sequentially photograph the surface of the electrode 110 which is moving on the transfer line. To this end, the electrode drying system may further include a jig which fixes the thermal imaging camera to make a predetermined angle with the electrode.

Specifically, the thermal imaging camera 130 may be positioned at the exit of the drying unit 120 as shown in FIG. 2. Namely, the thermal imaging camera 130 may photograph the surface of the electrode 110 which is moved out from the drying unit 120 by being positioned on the rear region of the drying unit 120 based on the transfer line, and the calculation unit evaluates the drying quality of the dried electrode.

FIG. 6 is a schematic diagram showing an electrode drying process according to another embodiment of the present invention.

Referring to FIG. 6, an electrode drying system 200 includes: a drying unit 120 which dries an electrode 110 which is moving on a transfer line, and a thermal imaging camera 130 which photographs a surface of the electrode in real time. The electrode may be manufactured by forming an electrode mixture layer as an electrode slurry is coated on a current collector by a coating die 101.

At this time, the thermal imaging camera 130 may be positioned on a moving path of the electrode 110 in the drying unit 120. In this case, the thermal imaging camera 130 may photograph the surface of the electrode 110 which is being dried in the drying unit 120, and the calculation unit evaluates the drying quality of the electrode which is being dried. As such, it is possible to recognize whether the drying state of the electrode is defective during the drying, and it is possible to prevent a manufactured electrode from having a poor drying quality. However, the configuration does not exclude a case that the thermal imaging camera is located on the exit portion of the drying unit, and the thermal imaging camera may be located at both the inside of the drying unit and the exit of the drying unit.

Further, the drying unit 120 may be divided into a plurality of drying zones. If the electrode is overdried or is not sufficiently dried during the drying process of the electrode, it is necessary to properly dry the electrode while changing the drying intensity. In this case, by dividing the drying unit 120 into a plurality of drying zones, drying conditions can be independently managed for each drying zone. FIG. 6 illustrates a drying unit 120 which has been divided into two drying zones, and each drying zone is defined as a first drying zone 120a and a second drying zone 120b. In this case, each drying zone 120a or 120b may be a space physically divided by actually installing an inner wall between the drying zones, or may be a space that is abstractly partitioned according to drying conditions performed in the drying zone.

Likewise, in the case that the drying unit 120 is divided into a plurality of drying zones 120a and 120b, the thermal imaging camera may be positioned between the drying zones 120a and 120b. Referring to FIG. 6, the second thermal imaging camera 130b positioned in the drying unit 120 may be positioned between the first drying zone 120a and the second drying zone 120b. In this case, it is possible to prevent the thermal imaging camera from being interfered with by a heat source inside the drying unit or prevent the thermal imaging camera from inhibiting the drying of the electrode. Further, if it is determined that the drying quality is poor as a result of the measurement by the second thermal imaging camera 130b positioned between the drying zones 120a and 120b, it is possible to change the drying condition at the second drying zone 120b in order to supplement this. A first thermal imaging camera 130a is positioned at the exit of the drying unit 120 so that the surface of the drying-completed electrode 110 can be measured.

Referring to FIG. 1, if the surface of the electrode is photographed by the thermal imaging camera 130 and temperature distribution data in a width direction of the electrode are then generated by the calculation unit 140, the image taken by the thermal imaging camera 130 and the temperature distribution data in a width direction of the electrode generated by the calculation unit 140 may be displayed by the output unit 150.

FIG. 7 is a block diagram showing the configuration of an electrode drying system according to another embodiment of the present invention.

Referring to FIG. 7, the electrode drying system 300 may further include a controller 160 which evaluates a drying quality of the electrode from the temperature distribution data and resets a drying condition of the electrode by reflecting a result of the evaluation. Namely, if it is determined that a drying state of the electrode is defective, the controller 160 may change the drying condition to satisfy the standard about the drying quality of the electrode.

As explained above, the calculation unit 140 may calculate a temperature distribution change in a width direction of the electrode and an average temperature in a width direction of the electrode over time from the image taken by the thermal imaging camera 130. Based on this, the controller 160 may evaluate the deviation of the dried degree in the width direction of the electrode and whether the electrode has been dried. If the deviation of the dried degree in the width direction of the electrode is excessively large, or the overall dried degree is low, it may be determined that the dried state of the electrode is defective. In this case, the controller 160 may change the drying intensity to alleviate the deviation in the dried degree in the width direction of the electrode or to dry the electrode further. For example, the intensity of the hot air, the temperature of the hot air, or the output of the infrared heater, the running speed of the electrode, and the like can be changed.

In addition, the present invention provides an electrode drying method.

FIG. 8 is a flowchart showing the procedure of an electrode drying method.

Referring to FIG. 8, the electrode drying method includes: inserting an electrode into a drying unit and drying the electrode in the drying unit (S10); photographing a surface of the electrode by a thermal imaging camera (S20); and generating temperature distribution data in a width direction of the electrode from the image obtained by the thermal imaging camera (S30).

According to the present invention, it is possible to secure temperature distribution data in a width direction of an electrode by using a thermal imaging camera. As such, it is possible to easily evaluate the drying quality of the electrode without inhibiting the efficiency of the manufacturing process. Namely, since it is possible to evaluate the drying quality of the moving electrode in real time, it is possible to detect a defect in advance and reduce the process loss by responding to the possible defect.

First, an electrode is manufactured by forming an electrode active material layer including an electrode active material on a current collector. Details of the electrode are the same as described above. If the electrode is inserted, a drying process is started by supplying the electrode into the above-described drying unit.

In this process, the surface of the electrode is photographed by the thermal image camera. The photographing of the surface of the electrode by the thermal imaging camera may be performed (a) during the drying of the electrode, (b) after the drying of the electrode, or (c) both during and after the drying of the electrode. Namely, according to the present invention, it is possible to effectively evaluate the drying quality of an electrode by photographing an electrode, which is being dried or has been dried, in real time using a thermal imaging camera.

If an image is taken by a thermal imaging camera, the temperature distribution data in a width direction of the electrode is derived from the image. This is performed by the calculation unit. Specifically, the temperature of the surface of the electrode may be derived from the color shown on the thermal image, and the temperature distribution data in a width direction of the electrode may be derived therefrom. The temperature distribution data in a width direction of the electrode may include a temperature distribution change in a width direction of the electrode and an average temperature in a width direction of the electrode over time. The details about this are the same as described above.

Further, the electrode drying method according to the present invention may further include evaluating a drying quality of the electrode based on temperature distribution data in a width direction of the electrode (S40). Specifically, at the step of evaluating the drying quality of the electrode, it is possible to evaluate the overall dried degree of the electrode and the deviation of the dried degree in the width direction of the electrode. For example, if a temperature difference between a highest temperature and a lowest temperature exceeds a preset reference value in the temperature distribution in the width direction, it indicates that the difference in the dryness in the width direction is large, and it may be determined that a drying state of the electrode is defective. Further, when the average temperature in a width direction of the electrode is less than a preset reference value, it indicates that the drying has not been completed, and it may be determined that a drying state of the electrode is defective.

Likewise, if the drying quality of the electrode is evaluated, the process of resetting a drying condition by reflecting a result of the evaluation (S50) is performed. The drying condition of the electrode may be related to the intensity of the drying, and some examples of the drying condition include the intensity of the hot air, the temperature of the hot air, the output of the infrared heater, and the moving speed of the electrode. For example, when it is determined that the electrode has not been dried, it is possible to increase the intensity of the hot air, the temperature of the hot air or the output of the infrared heater and reduce the moving speed of the electrode. Further, when the dried degree of the edge portion in the width direction of the electrode is excessively large, compared to the central portion, it is possible to decrease the intensity of the hot air, the temperature of the hot air, or the output of the infrared heater in the edge portion, compared to the central portion. Alternatively, it is possible to alleviate the deviation in the dried degree in the width direction by blocking hot air or infrared rays applied to the edge portion of the electrode.

The above description is merely illustrative of the technical idea of the present invention, and those skilled in the art to which the present invention pertains may make various modifications and variations without departing from the essential characteristics of the present invention. Therefore, the drawings disclosed in the present invention are not intended to limit the technical idea of the present invention but to describe the present invention, and the scope of the technical idea of the present invention is not limited by these drawings. The scope of protection of the present invention should be interpreted by the following claims, and all technical ideas within the scope equivalent thereto should be construed as being included in the scope of the present invention.

On the other hand, in this specification, terms indicating directions such as up, down, left, right, before, and after are used, but it is obvious that these terms are for convenience of description only and may change depending on the location of the object or the location of the observer.

DESCRIPTION OF REFERENCE NUMERALS

100, 200, 300: electrode drying system
101: coating die
110: electrode
111: current collector
112: electrode active material layer
120: drying unit
120*a*: first drying zone

120*b*: second drying zone
121: heat source
130: thermal imaging camera
130*a*: first thermal imaging camera
130*b*: second thermal imaging camera
140: calculation unit
150: output unit
160: controller

The invention claimed is:

1. A system for drying an electrode, the system comprising:
   a drying unit which dries an electrode which is moving on a transfer line;
   a thermal imaging camera which photographs a surface of the electrode in real time;
   a calculation unit which stores an image taken by the thermal imaging camera, and generates temperature distribution data in a width direction of the electrode from an image; and
   an output unit which outputs the image and the temperature distribution data in the width direction of the electrode.

2. The system of claim 1, wherein the thermal imaging camera photographs the surface of the electrode, and wherein the calculation unit stores an image in a predetermined frame or time unit.

3. The system of claim 1, wherein the calculation unit calculates a temperature distribution change in the width direction of the electrode and an average temperature in the width direction of the electrode over time from the image.

4. The system of claim 1, wherein the thermal imaging camera is positioned at an exit of the drying unit.

5. The system of claim 1, wherein the thermal imaging camera is positioned on a moving path on the transfer line of the electrode in the drying unit.

6. The system of claim 5, wherein the drying unit is divided into a plurality of drying zones, and wherein the thermal imaging camera is positioned between the drying zones.

7. The system of claim 1, further comprising a jig which fixes the thermal imaging camera to make a predetermined angle with the electrode.

8. The system of claim 1, further comprising a controller which evaluates a drying quality of the electrode from the temperature distribution data and resets a drying condition of the electrode by reflecting a result of the evaluation.

9. A method for drying an electrode, the method comprising:
   inserting an electrode into a drying unit and drying the electrode in the drying unit;
   photographing a surface of the electrode by a thermal imaging camera; and generating temperature distribution data in a width direction of the electrode from an image obtained by the thermal imaging camera.

10. The method of claim 9, wherein the temperature distribution data in the width direction of the electrode includes a temperature distribution change and an average temperature in the width direction of the electrode over time.

11. The method of claim 9, wherein the photographing of the surface of the electrode by the thermal imaging camera is performed during the drying of the electrode, after the drying of the electrode, or both during and after the drying of the electrode.

12. The method of claim 9, further comprising: evaluating a drying quality of the electrode based on temperature distribution data in the width direction of the electrode.

13. The method of claim 12, wherein if a temperature difference between a highest temperature and a lowest temperature exceeds a preset reference value in the temperature distribution in the width direction, it is determined that a drying state of the electrode is defective.

14. The method of claim 12, wherein when an average temperature in the width direction of the electrode is less than a preset reference value, it is determined that a drying state of the electrode is defective.

15. The method of claim 12, further comprising resetting a drying condition by reflecting a result of the evaluating.

16. The system of claim 1, wherein the thermal imaging camera consecutively or sequentially photographs the surface of the electrode.

* * * * *